United States Patent [19]

Kuus et al.

[11] 4,364,498
[45] Dec. 21, 1982

[54] FASTENING DEVICE FOR ROOF CARRIER OF A MOTOR VEHICLE

[75] Inventors: Olaf Kuus; Jakob Relovsky, both of Sindelfingen, Fed. Rep. of Germany

[73] Assignee: Daimler-Benz A.G., Stuttgart, Fed. Rep. of Germany

[21] Appl. No.: 127,636

[22] Filed: Mar. 6, 1980

[30] Foreign Application Priority Data

Jun. 3, 1979 [DE] Fed. Rep. of Germany ....... 2908682
Jul. 2, 1980 [DE] Fed. Rep. of Germany ....... 3004447

[51] Int. Cl.$^3$ ................................................ B60R 9/04
[52] U.S. Cl. ............................ 224/42.45 R; 224/309; 224/314
[58] Field of Search ............... 224/309, 310, 314–328; 248/271, 539; 52/110; 138/96 R, 96 T; 403/197

[56] References Cited

U.S. PATENT DOCUMENTS

| | | | |
|---|---|---|---|
| 2,977,993 | 4/1961 | Scherer | 138/96 T |
| 3,724,730 | 4/1973 | Olsen et al. | 224/327 X |
| 3,868,732 | 3/1975 | Engelhart | 403/197 X |
| 4,119,121 | 10/1978 | Smiley | 138/96 T |
| 4,281,783 | 8/1981 | Ingram | 224/309 X |

FOREIGN PATENT DOCUMENTS 1008873  5/1952  France ................. 224/325

Primary Examiner—William Price
Assistant Examiner—Gary E. Elkins
Attorney, Agent, or Firm—Paul M. Craig, Jr.

[57] ABSTRACT

A fastening arrangement for fastening a carrier to a roof of a motor vehicle. The motor vehicle includes a support member which extends in a longitudinal direction of the vehicle and is disposed at respective side edges thereof. The fastening arrangement includes a carrier bracket which is adapted to be mounted near a side edge of the motor vehicle. The carrier bracket includes a threaded bore for accommodating a threaded portion of a carrier holder of the carrier. A cap cover is detachably insertable into the threaded bore so as to seal the bore when the carrier holder is not accommodated therein. The carrier bracket may be completely disposed beneath the surface of the roof or include a portion which projects beyond the upper surface of the roof. The carrier bracket may be provided with an annular flange that is applied with a seal and with pretensioning to the roof surface with a lower portion of the bracket being swagged so as to fix the bracket to the roof surface. The lower portion of the carrier bracket may also be provided with a threaded portion that serves to receive a threaded nut for fixing the barrier bracket at the roof.

6 Claims, 9 Drawing Figures

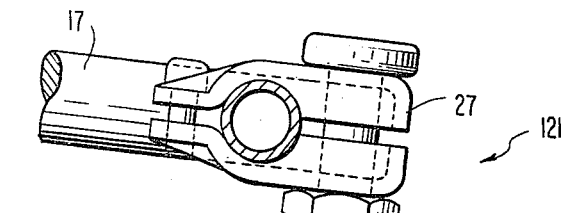
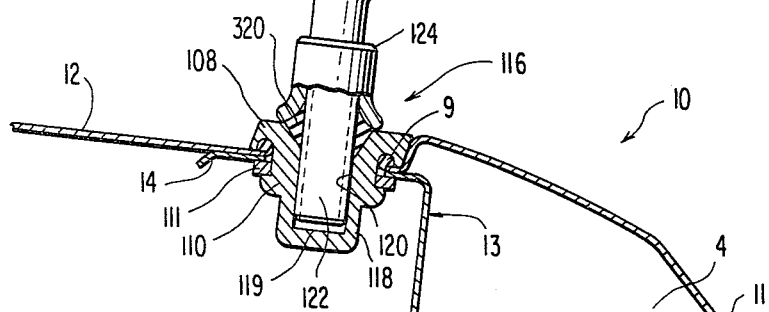
FIG. 4
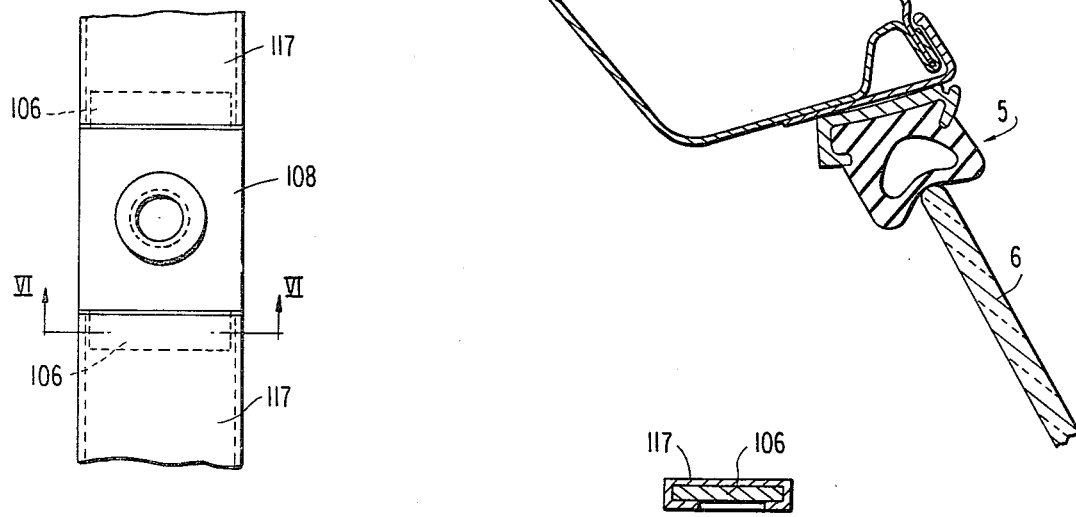
FIG. 5
FIG. 6
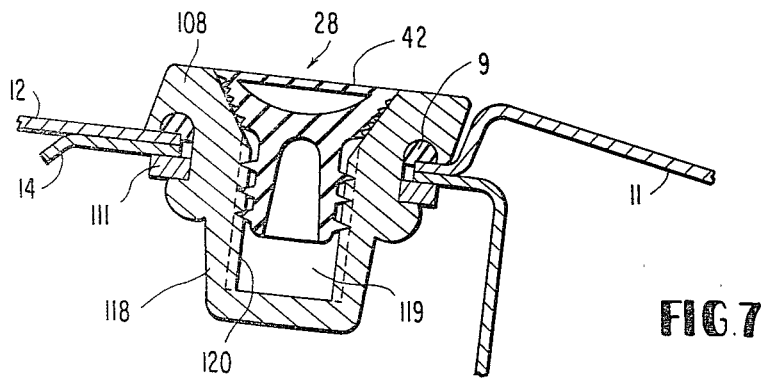
FIG. 7

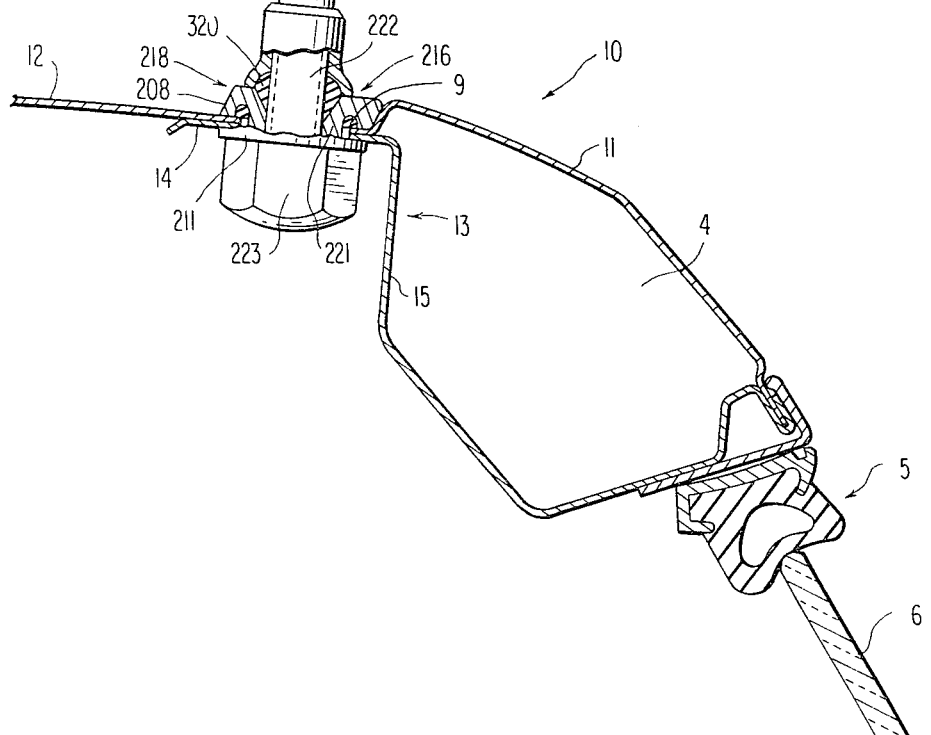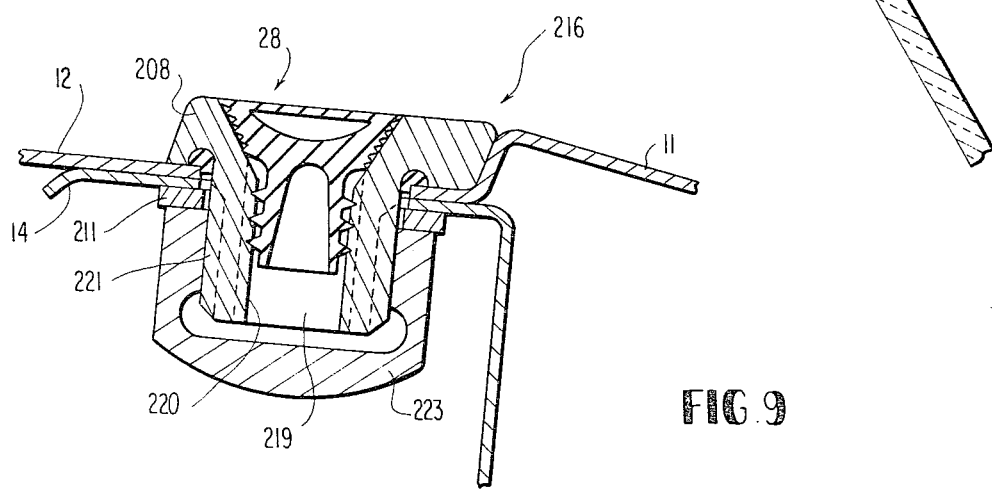

FASTENING DEVICE FOR ROOF CARRIER OF A MOTOR VEHICLE

The present invention relates to a fastening device and, more particularly, to a fastening device for a vehicle carrier adapted to be disposed on a roof of the vehicle, especially passenger motor vehicles, so as to enable a mounting of, for example, luggage racks, ski holders, or the like on the top of the vehicle.

Fastening devices have been proposed which are configured so as to allow fastening by clamping an edge of the roof in a vicinity of the rain gutter or strip normally provided on the motor vehicle. A disadvantage of this proposed fastening device resides in the fact that not only do these proposed fasteners provide an unpleasant appearance in a region of the rain gutter but also, since the fastening devices are near to the surface at the sides of the vehicle, such fastening devices present a possible danger or injury to a passerby and are especially dangerous or pose a potential injury problem in accidents. A further disadvantage resides in the fact that the rain gutter necessary for accommodating the fastening device has vehicle-related drawbacks such as, for example, additional expense, increased wind resistance, stylistic drawbacks, etc.

The aim underlying the present invention resides in providing a fastening device for a roof carrier of a motor vehicle which offers increased passive security for a passerby in a zone of the roof edge of the motor vehicle and enables a configuration of the roof edge to be freely designed independently of the type of fastening of the roof carrier.

In accordance with advantageous features of the present invention, a fastening device for motor vehicle top carriers such as, for example, luggage racks, ski holders of the like are provided wherein a sunken carrier bracket is disposed in a region of the roof surface, advantageously, near an edge of the roof with the carrier bracket including a receiving bore therein that is provided with an internal thread which receives a bolt-formed top carrier holder with a threaded piece adapted to be threadably inserted in the receiving bore in addition to a covering cap which may be detachably set in the bracket.

By virtue of the above-noted features of the present invention, it is possible to realize a shifting of the carrier holder away from the edge of the vehicle to a surface of the roof thereby considerably contributing to passive safety for the passerby since in fastening carriers on vehicles, the parts of the fastening device are no longer disposed in a zone of the roof edge thereby providing potential hazards. Additionally, clamping is no longer required for fastening the car top carriers and, especially, there need not be a rain gutter provided on the outer zone of the roof edge. Thus, the provision of a fastening device such as proposed by the present invention enables the roof edge of the motor vehicle to be designed independently of the requirement for fastening of vehicle top carriers and especially admits of the elimination of a rain gutter which increases the wind resistance of the vehicle. Additionally, all style requirements for the motor vehicle may be fully considered. The formation of the roof edge of the vehicle can be greatly simplified and made less expensive by the elimination of the rain gutter.

Additionally, by virtue of the fastening device of the present invention, there is hardly any increase in the overall weight and, in particular, without the loss of any stability, it is ensured, as with previous fastening devices, that the vehicle top carriers can be securely and acceptably fixed to the vehicle. Moreover, by the provision of the covering cap, a penetration of dampness such as, for example, water, into the carrier bracket is prevented and the receiving bore in the carrier bracket is entirely closed outwardly in a region of the roof surface with the outer surface of the cover being matched with the roof both in form and in color.

Advantageously, the carrier bracket may have a somewhat block-like configuration and be formed of a metal or a plastic material and be received in a corner region of members of the roof that border on one another and/or members of the roof frame on a side edge of the vehicle with a substantially precise fit. The carrier bracket may be fixed in place by means of, for example, a metal adhesive.

Advantageously, the carrier bracket is fixed in a corner region of a somewhat angular beveled section of the roof frame on the side edge of the vehicle with the angular beveled section of the roof frame extending with a first leg section beneath the roof covering and on top of the upper surface of the carrier bracket. The leg section is provided with a passage opening having a diameter which is greater than the diameter of the receiving bore.

Preferably, the receiving bore of the carrier bracket widens somewhat as a reversed truncated cone toward an upper side of the carrier bracket and toward the roof surface so as to form an upper centering surface so as to enable a centering of the carrier bracket before the bracket is secured or fixed in the corner region. The roof surface, in an area that extends over the top surface of the carrier bracket, is also provided with an opening and a shoulder on a side edge toward the carrier bracket. The shoulder tapers toward the receiving bore of the carrier bracket with about the same angle of opening as the truncated conical centering surface and is made as a centering flange that engages the bracket to center the same in the upper centering surface thereof with an essentially precise fit.

The covering cap of the present invention is made at least in a somewhat mushroom shape and includes a shaft or shank portion adapted to engage in the receiving bore. The shaft or shank portion includes anchoring lamellae formed somewhat like annular lands along an outer surface thereof which are adapted to lock in essentially positive engagement in threads of the inner threading of the carrier bracket. The covering cap also includes a covering head with essentially truncated conical edge surfaces that lead over from the outer edge of the head to the shaft or shank portion with the conical edge surfaces also being provided with outwardly extending sealing lamellae. The truncated conical edge surfaces may extend at about the same angle of the opening of the centering flange with the centering flange receiving the covering head with a sealing of the surfaces of contact.

Advantageously, the covering head is provided with a trough-like depression extending from an upper surface thereof downwardly with a tool engaging surface such as, for example, a slit or the like being provided inside the trough-like depression. The covering head may also be provided with a plane covering wall on its upper side which wall covers the trough-like depression and is adapted to be pierced so as to enable acess to the tool engaging surface. Advantageously, the covering cap of the present invention is made as a single-piece injected molded part of a plastic material.

By virtue of the provision of the inverted truncated cone and the formation of the centering surface for the carrier bracket and by virtue of the fact that the roof surface is more or less drawn in like a funnel in a region of the covering cap, a self-centering of the carrier bracket is obtained; however, in some circumstances, it is possible that the threaded receiving hole of the carrier bracket may be so directed that a set-in carrier holder may be disposed at an angle with respect to the roof surface. To avoid any possibility of misalignment of the carrier bracket relative to the roof surface, in accordance with further advantageous features of the present invention, a carrier bracket is provided which penetrates upwardly through the roof surface, with the carrier bracket being provided with a peripheral flange that is applied with a seal in a pre-tensioning on the roof surface.

By virtue of the last-mentioned advantageous feature of the present invention, a simple fastening device is provided that will always guarantee a correct seating of the carrier bracket.

Advantageously, in accordance with the present invention, the carrier bracket is made in one piece and a portion thereof that is disposed under the roof surface is supplied by a swaging or upsetting process possibly with the introduction of a washer or shim on an underside of the roof surface. The workstep or installation of the carrier bracket can readily be introduced in the manufacture of an unfinished car body so that later assembly operations may be omitted.

However, it is also possible in accordance with the present invention to construct the carrier bracket so as to be bipartite wherein the peripheral or annular flange extends downward into a threaded portion that serves to receive a threaded nut for fixing the carrier bracket at the roof surface.

With the cover cap set or pressed into the receiving bore of the carrier bracket prior to a painting of the motor vehicle, it may be possible that a portion of the roof surface may remain unpainted and may be subject to rust. Additionally, it is possible that upon a first removal of the cover cap painted in place, chips of paint may break off at the surface in an area surrounding the cover cap. Moreover, while the cover cap may be painted in a separate process to avoid these problems, such as approach would be somewhat expensive and would require additional storage facilities.

Therefore, in accordance with further advantageous features of the present invention, the annular or peripheral flange may be provided with two opposed pieces extending in a longitudinal direction of the vehicle which serve for a plugged reception of decorative strips that join flush together with one another and cover an installed cover cap. By making the decorative strip the same color as the top of the carrier bracket or top surface of the vehicle, it is possible to dispense with the painting or coloring of the cover caps. Thus, by virtue of the carrier bracket which penetrates the roof surface and the provision of the opposed pieces at the annular or peripheral flange of the carrier bracket not only is a retention of the locking engagement of the threaded hole in the carrier bracket ensured but also it is ensured that a uniform coloring of the cover cap is obtained.

Accordingly, it is an object of the present invention to provide a fastening device for a motor vehicle roof carrier which avoids, by simple means, shortcomings and disadvantages encountered in the prior art.

Another object of the present invention resides in providing a fastening device for a motor vehicle roof top carrier which creates conditions for a reduction or even an entire elimination of rain gutters provided on an edge of the roof of the motor vehicle.

Another object of the present invention resides in providing a fastening device for a motor vehicle roof top carrier which considerably contributes to a passive safety of passersby.

A still further object of the present invention resides in providing a fastening device for a motor vehicle roof top carrier which enables a shifting of the carrier away from an edge of the roof toward the center of the roof surface.

Another object of the present invention resides in providing a fastening device for a motor vehicle roof top carrier which eliminates or at least reduces the size of rain gutters of the motor vehicle so as to improve wind resistant coefficients of the vehicle as well as to meet special style requirements in the edge zone of the motor vehicle roof.

A still further object of the present invention resides in providing a fastening device for a motor vehicle roof top carrier which is simple in construction and therefore relatively inexpensive to manufacture.

Another object of the present invention resides in providing a fastening device for a motor vehicle roof top carrier which is lightweight and yet ensures a stable secure acceptable mounting of the carrier on the roof of the vehicle.

These and other objects, features, and advantages of the present invention will become more apparent from the following description when taken in connection with the accompanying drawings which show, for the purposes of illustration only, several embodiments in accordance with the present invention, and wherein:

FIG. 4 is a partially schematic cross sectional view of a righthand roof edge of a passenger vehicle provided with another embodiment of a fastening device for a vehicle top carrier in accordance with the present invention;

FIG. 5 is a top view of a decorative strip adapted to adjoin both sides of a carrier bracket of a fastening device in accordance with the present invention;

FIG. 6 is a cross-sectional view taken along the lines VI—VI of FIG. 5;

FIG. 7 is a cross sectional view of another embodiment of a cover cap for a fastening device in accordance with the present invention;

FIG. 8 is a partially schematic cross-sectional view of a righthand roof edge of a passenger vehicle provided with a further embodiment of a fastening device for a vehicle top carrier in accordance with the present invention; and FIG. 9 is an enlarged detail view of a fastening device of FIG. 8 with a covering cap set therein.

Figure 1:
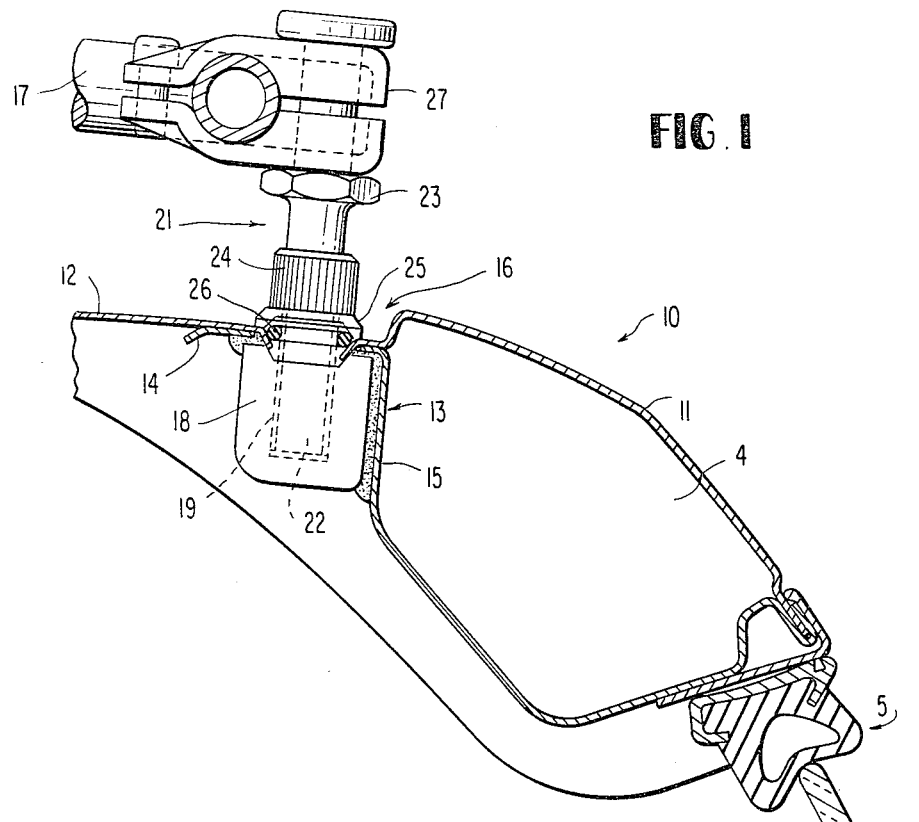
FIG. 1 is a partially schematic cross sectional view of a righthand roof edge of a passenger vehicle provided with a fastening device for a vehicle top carrier in accordance with the present invention.

Referring now to the drawings wherein like reference numerals are used throughout the various views to designate like parts and, more particularly, to FIG. 1, according to this Figure, an edge generally designated by the reference numeral 10 of a vehicle includes a roof frame or longitudinal support 4 having an outer roof covering 11 which extends from the edge 10 of the vehicle toward the left or center thereof so as to define a roof surface 12 at a top of the vehicle. At an inner side, the roof frame or longitudinal support 4 is provided with an angled or beveled corner section generally designated by the reference numeral 13 which includes an upper leg section 14 and a lower leg section 15 that forms a more or less vertically extending downward brace. The upper leg section 14 extends, without clearance, below the roof covering 11 and roof surface 12. A seal generally designated by the reference numeral 5 is provided at a lower end of the roof frame or longitudinal support 4 to enable a sealing between the roof frame 4 and a lateral member such as, for example, a window 6.

A fastening device generally designated by the reference numeral 16 is provided for fastening a car top carrier 17 such as, for example, a luggage rack, a ski holder, or the like, to the top of the vehicle. The fastening device 16 serves for a simple yet stable fastening of the carrier 17 on the vehicle roof near the righthand edge side of the vehicle. As can readily be appreciated, a similar fastening device 16 is provided near the lefthand edge of the vehicle for fastening the other end of the carrier 17 to the top of the vehicle.

The fastening device 16 includes a carrier bracket 18 which may be fastened as a metallic block-shaped member or a plastic block-shaped member such as, for example, an injection molded piece. The carrier bracket 18 is mounted beneath the roof surface 12 in a zone of the outer roof covering 11 near the edge 10 of the roof and is disposed so as not to protrude outwardly above the roof surface 12 whereby the carrier bracket 18 is almost entirely invisible from outside of the vehicle.

The carrier bracket 18 includes an internal receiving bore 19 provided with an internal thread 20 with the receiving bore 19 being adapted to threadably accommodate a threaded portion 22 of a bolt-formed roof top carrier holder generally designated by the reference numeral 21. The internal thread 20 and the threaded portion 22 cooperates so as to firmly but detachably mount the roof-top carrier holder 21 on the vehicle. The roof top carrier holder 21 also includes a shaped-on hexagon nut portion 23 for enabling engagement by a suitable tool such as, for example, a wrench (not shown). Additionally, the threaded portion 22 has, for example, a knurled nut 24 with an edge flange 25 which enables a firm seating of the fastening device 16 and, at the same time, ensures an acceptable sealing by means of, for example, a rubber packing ring 26. A clamping claw 27 is arranged on a portion of the carrier holder 21 which extends above the hexagon nut portion 23 for enabling a fixing of the carrier 17 to the carrier holder 21.

Figure 2:
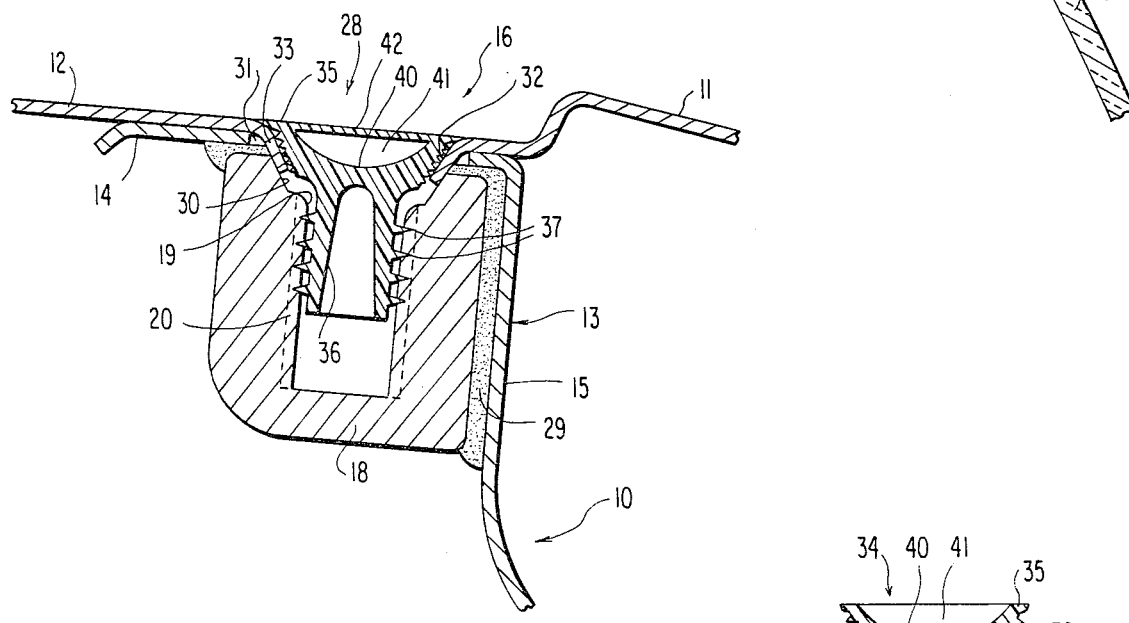
FIG. 2 is an enlarged cross-sectional view of a detail of the fastening device of FIG. 1 with a covering cap in accordance with the present invention set therein.

As shown most clearly in FIG. 2, in addition to the carrier bracket 18, the fastening device 16 includes a covering cap generally designated by the reference numeral 28 formed of, for example, a shaped plastic. The covering cap 28 is adapted to be detachably introduced into the receiving bore 19 of the carrier bracket 18. The carrier bracket 18 is disposed in a corner zone of the angular or corner section 13 formed by the upper and lower leg sections 14, 15, in an essentially precise fit and is fixed or mounted thereat by, for example, a suitable metal adhesive 29. Thus, with the exception of the metal adhesive 29, the carrier bracket 18 essentially lies flush on both the upper and lower leg portions or sections 14, 15.

The receiving bore 19 of the carrier bracket 18 widens or flares outwardly toward the top and toward the upper leg section 14 in a manner of an inverted truncated cone and forms thereby an upper centering surface 30 for the carrier bracket 18. The upper leg section 14, extending above an upper side of the carrier bracket 18, is provided with a passage opening 31 in a region of the carrier bracket 18, with a diameter of the passage opening 31 being greater than a diameter of the centering surface 30 at its maximum area of opening. The roof surface 12, above the upper side of the upper leg section 14 in an area which extends over the carrier bracket 18, has an opening 32 provided with a shoulder 33 on a side edge, with the shoulder 33 being directed toward the carrier bracket 18. The shoulder 33 tapers in a somewhat truncated cone fashion toward the receiving bore 19 of the carrier bracket 18 with about the same angle as the angle of the opening of the truncated cone shaped centering surface 30 whereby the shoulder 33, forming the centering flange for the upper leg section 14, engages, with an essentially precise fit in the upper centering surface 30, so as to center the carrier bracket 18. This centering is significant in order to ensure a stable fixation of the carrier bracket 18 so that, in this region, tensile and compressive forces as well as fluctural stresses can be accommodated.

To seal the opening of the receiving bore 19 when the roof top carrier holder 12 is not mounted on the vehicle, a covering cap generally designated by the reference numeral 28 (FIG. 2) or a covering cap generally designated by the reference numeral 34 (FIG. 3) may be employed each of which has the common structural features described more fully hereinbelow.

Both covering caps 28, 34, being color coordinated to the color of the roof of the vehicle, have at least a somewhat mushroom shaped configuration and include a cover head 35 and a stem or shaft portion 36 connected therewith which is adapted to engage in the receiving bore 19 of the carrier bracket 18. The stem or shaft portion 36 is provided with anchoring lamellae 37 along an outer surface thereof that are rather like annular lands which engage essentially in a positive manner in the inner portion of the threads 20 of the carrier bracket 18.

When installed, the covering cap 28 or 34 may be pressed into the carrier bracket 18 to the required height of the roof surface 12 whereby the anchoring lamellae 37 lock in the threads 20. As is apparent, essentially a continuous adjustment of the covering cap 28 or 34 is possible because, during a pressing or setting in of the covering cap 28 or 34, the anchoring lamellae 37 are not yet fitted into the form of the inner thread 20.

The cover head 35 of the covering cap 28 or 34 has an essentially truncated cone edge surface 38 that extends over from the outer edge of the cover head 35 to the stem or shaft 36. The edge surface 38 is provided with outwardly protruding sealing lamellae 39 shown most clearly on the cap 34 in FIG. 3. The truncated cone edge 38 is disposed at about the same angle of opening as the angle of the shoulder 33 that acts as the centering flange. When the covering cap 28 or 34 has been pressed in place, the shoulder 33 receives the cover head 35 at the inside thereof with the sealing lamellae 39 being applied with a seal against the inner surface of the shoulder 33 so that a penetration of dampness and, especially, a flowing of water into the receiving bore 19 of the carrier bracket 18 is prevented.

The cover head 35 may be provided with a trough-like depression 40 of a slight depth on a top surface thereof. The trough-like depression 40 may be provided with a tool-engaging surface such as, for example, a slit 41. Alternatively, the trough-like depression may also be entirely omitted if desired.

In the covering cap 28 of FIG. 2, a cover wall 42 is provided on an upper side of the cover head 35. The cover wall 42 is integrally formed with the cover cap 28 and is preferably constructed as a flat wall. The cover wall 42, is present, extends over and covers the trough-like depression 40 and, especially, the tool engaging surface or slit 41 making both the trough-like depression 40 and the slit 41 invisible from outside of the vehicle. Thus, the cover wall 42 cleanly and smoothly covers the receiving bore 19 and forms a neat transistion between the upper surface of the covering cap 28 and the outer roof surface 12. The cover wall 42 is constructed in such a manner that it may be perforated if the cover cap 28 is to be removed from the carrier bracket 18. After a perforation of the cover wall 42, the slit 41 is accessible so that, for example, a screwdriver, a coin, or similar tool may be inserted into the trough-like depression 40 and into the slit 41 so as to enable a turning of the covering cap 28. By turning, the covering cap 28, set in the carrier bracket 18, may be taken out of the receiving bore 19 of the carrier bracket 18 so that the vehicle top carrier holder 21 (FIG. 1) with its threaded portion 22 may then be inserted into the receiving bore 19 and fixedly anchored to the carrier bracket 18. The carrier bracket 18 then becomes the bearing part for the carrier holder 21 and the carrier rack 17. All forces that act upon the carrier holder 21 and/or carrier 17 are reliably and safely received by the carrier bracket 18 and the fastening device 16.

Figure 3:
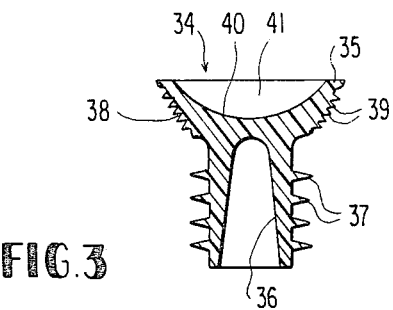
FIG. 3 is a cross-sectional view of another embodiment of a cover cap for the fastening device of the present invention.

The covering cap 34, as shown in FIG. 3, is not provided with an upper cover wall 42 in a region of the covering head 35 so that the upper slit 41 is freely accessible at all times. If the carrier 17 and carrier holder 21 is removed, the cap 34 serves as a cover for the carrier bracket 18. The covering cap 34 is pressed into the receiving bore 19 of the carrier bracket 18 and is secured therein in the same manner as described hereinabove in connection with the covering cap 28. As can be appreciated, if desired, the covering cap 34 may also be provided with an upper cover wall. By virtue of the disposition of the carrier bracket at the edges of the motor vehicle, it is possible to shift the carrier 17 away from the edge of the roof toward the center area of the roof surface 12 thereby considerably contributing to a passive safety for any passer by.

As shown in FIG. 4, a fastening device generally designated by the reference numeral 116 is provided for fastening the carrier 17 to the top of the vehicle. The fastening device 116 includes a carrier bracket 118 which penetrates or extends through an opening provided in the roof surface 12 in a region of the roof edge 10.

The carrier bracket 118 includes a peripheral flange 108 which bears on the roof surface 12 with a peripheral seal 9 being provided so as to prevent the penetration of moisture. The peripheral flange 108 extends over into a portion 110 disposed below the roof surface 12 that braces, by way of a washer 111, on the upper leg section 14 below the roof surface 12 after an introduction of the washer 111, by a swaging or upsetting process.

The carrier bracket 118 is provided with a receiving bore 119 which includes an internal thread 120 adapted to threadably accommodate a threaded portion 122 of a bolt-formed roof type carrier holder generally designated by the reference numeral 121. The internal thread 120 and threaded portion 122 cooperate so as to firmly but detachably mount the roof top carrier holder 121 on the vehicle.

As shown in FIG. 7, when the carrier holder 121 is removed from the receiving bore 119, the covering cap 28 or the covering cap 34 may be pressed into the receiving bore 119 of the carrier bracket 118 so as to seal the receiving bore 119 from the elements.

As shown in FIGS. 5 and 6, the peripheral flange 108 is provided with two mutually opposed pieces 106, extending in a longitudinal direction of the vehicle, which serve for a plugged or snap type acceptance of decorative strips 117 that are joined flush with one another and are of the same color as the outside of the carrier bracket 118, which decorative strips 117 may be adapted to extend to flange 108 over opposed pieces 106.

If the carrier holder 121 is to be installed so as to enable a mounting of the carrier 17, the cover cap 28 or 36 is removed and the threaded portion 122 of the top carrier holder 121 is threadably inserted into the receiving bore 119. A seal 120 is interposed between a collar portion 124 and the peripheral flange 108. The carrier holder 121 may be further supplemented, in a manner not illustrated in the drawing, by, for example, braces or other bolted-in top carrier holders.

As shown in FIGS. 8 and 9, a fastening device generally designated by the reference numeral 216 is provided for fastening the carrier 17 to the top of the vehicle. The fastening device 216 is formed as a two part carrier bracket generally designated by the reference numeral 218. The carrier bracket 218 includes a peripheral flange 208 that goes into a shank portion provided with threads 221 on an external surface thereof and internal threads 220 in a receiving bore 219. A threaded nut 223 cooperates with the external threads so as to secure the carrier bracket 218 at the roof surface 12. A covering cap 28 or 36 may be pressed into the receiving bore 219 so as to seal the receiving bore 219 from the elements when the threaded portion 222 of the carrier holder generally designated by the reference numeral 221 is removed from the receiving bore 219. A seal 220 is interposed between a collar portion and the peripheral flange 208. In other respects, the construction of FIGS. 8 and 9 largely corresponds to the construction of FIGS. 4-7.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A fastening arrangement for fastening a carrier to a roof of a motor vehicle, the motor vehicle including a support member extending in a longitudinal direction of the vehicle and disposed at respective side edges of the vehicle, characterized in that the fastening arrangement includes a carrier bracket adapted to be mounted near a side edge of the motor vehicle, a threaded bore means is provided in the carrier bracket for accommodating a threaded portion of the carrier holder means, and in that a cover means is detachably insertable into the threaded bore means so as to seal the bore means when the carrier holder means is not accommodated in the bore means, wherein the roof is provided with an opening in an area in which the carrier bracket is to be mounted, characterized in that the carrier bracket includes a first portion disposed below a surface of the roof and a second portion which extends through the opening in the roof and terminates above an upper surface of the roof, the carrier bracket includes a peripheral flange on the second portion thereof, the peripheral flange has a lower portion adapted to bear against the upper surface of the roof with a predetermined pretensioning, the first and second portion of the carrier bracket are integrally formed, and the carrier bracket is fixed at the roof by a swaging of the first portion of the carrier bracket, a seal means is interposed between the peripheral flange and the upper surface of the roof, and further characterized in that two mutually opposed members extending in a longitudinal direction of the vehicle are provided at the flange, said two members being adapted to receive decorative strips that join flush with one another.

2. A fastening arrangement for fastening a carrier to a roof of a motor vehicle, the motor vehicle including a support member extending in a longitudinal direction of the vehicle and disposed at respective side edges of the vehicle, characterized in that the fastening arrangement includes a carrier bracket adapted to be mounted near a side edge of the motor vehicle, a threaded bore means is provided in the carrier bracket for accommodating a threaded portion of the carrier holder means, and in that a cover means is detachably insertable into the threaded bore means so as to seal the bore means when the carrier holder means is not accommodated in the bore means, the carrier bracket is adapted to be mounted in a vicinity of the support member, wherein the roof is provided with an opening in an area in which the carrier bracket is to be mounted, characterized in that the carrier bracket includes a first portion disposed below a surface of the roof and a second portion which extends through the opening in the roof and terminates above an upper surface of the roof, the carrier bracket includes a peripheral flange on the second portion thereof, the peripheral flange has a lower portion adapted to bear against the upper surface of the roof with a predetermined pretensioning, the first and second portion of the carrier bracket are integrally formed, and the carrier bracket is fixed at the roof by a swaging of the first portion of the carrier bracket, a seal means is interposed between the peripheral flange and the upper surface of the roof, and further characterized in that two mutually opposed members extending in a longitudinal direction of the vehicle are provided at the flange, said two members being adapted to receive decorative strips that join flush with one another.

3. A fastening arrangement according to one of claims 1 or 2, characterized in that the decorative strips have the same color as the color of at least one of the top of the carrier brackets or the cover means.

4. A fastening arrangement for fastening a carrier to a roof of a motor vehicle, the motor vehicle including a support member extending in a longitudinal direction of the vehicle and disposed at respective side edges of the vehicle, characterized in that the fastening arrangement includes a carrier bracket adapted to be mounted near a side edge of the motor vehicle, a threaded bore means is provided in the carrier bracket for accommodating a threaded portion of the carrier holder means, and in that a cover means is detachably insertable into the threaded bore means so as to seal the bore means when the carrier holder means is not accommodated in the bore means, wherein the roof is provided with an opening in an area in which the carrier bracket is to be mounted, characterized in that the carrier bracket includes a first portion disposed below a surface of the roof and a second portion which extends through the opening in the roof and terminates above an upper surface of the roof, the carrier bracket includes a peripheral flange on the second portion thereof, the peripheral flange has a lower portion adapted to bear against the upper surface of the roof with a predetermined pretensioning, the carrier bracket is of a bipartite construction, and in that the first portion of the carrier bracket includes a threaded section adapted to cooperate with a threaded nut so as to fix the carrier bracket to the roof of the vehicle, and further characterized in that two mutually opposed members extending in a longitudinal direction of the vehicle are provided at the flange, said two members being adapted to receive decorative strips that join flush with one another.

5. A fastening arrangement for fastening a carrier to a roof of a motor vehicle, the motor vehicle including a support member extending in a longitudinal direction of the vehicle and disposed at respective side edges of the vehicle, characterized in that the fastening arrangement includes a carrier bracket adapted to be mounted near a side edge of the motor vehicle, a threaded bore means is provided in the carrier bracket for accommodating a threaded portion of the carrier holder means, and in that a cover means is detachably insertable into the threaded bore means so as to seal the bore means when the carrier holder means is not accommodated in the bore means, the carrier bracket is adapted to be mounted in a vicinity of the support member, wherein the roof is provided with an opening in an area in which the carrier bracket is to be mounted, characterized in that the carrier bracket includes a first portion disposed below a surface of the roof and a second portion which extends through the opening in the roof and terminates above an upper surface of the roof, the carrier bracket includes a peripheral flange on the second portion thereof, the peripheral flange has a lower portion adapted to bear against the upper surface of the roof with a predetermined pretensioning, the carrier bracket is of a bipartite construction, and in that the first portion of the carrier bracket includes a threaded section adapted to cooperate with a threaded nut so as to fix the carrier bracket to the roof of the vehicle, and further characterized in that two mutually opposed members extending in a longitudinal direction of the vehicle are provided at the flange, said two members being adapted to receive decorative strips that join flush with one another.

6. A fastening arrangement according to one of claims 4 or 5, characterized in that the decorative strips have the same color as the color of at least one of the top of the carrier brackets or the cover means.

* * * * *